United States Patent
Lamy-Bergot

(10) Patent No.: US 9,363,760 B2
(45) Date of Patent: Jun. 7, 2016

(54) METHOD AND SYSTEM ALLOWING THE DYNAMIC ALLOCATION OF POWER AND/OR OF MODULATION IN A SYSTEM COMPRISING N CHANNELS

(71) Applicant: THALES, Neuilly sur Seine (FR)

(72) Inventor: Catherine Lamy-Bergot, Gennevilliers (FR)

(73) Assignee: Thales, Courbevoie (FR)

( * ) Notice: Subject to any disclaimer, the term of this patent is extended or adjusted under 35 U.S.C. 154(b) by 119 days.

(21) Appl. No.: 14/350,800

(22) PCT Filed: Oct. 9, 2012

(86) PCT No.: PCT/EP2012/069964
§ 371 (c)(1),
(2) Date: Apr. 9, 2014

(87) PCT Pub. No.: WO2013/053707
PCT Pub. Date: Apr. 18, 2013

(65) Prior Publication Data
US 2014/0254493 A1     Sep. 11, 2014

(30) Foreign Application Priority Data

Oct. 10, 2011 (FR) ...................................... 11 03085

(51) Int. Cl.
| | | |
|---|---|---|
| *H04W 4/00* | (2009.01) | |
| *H04W 52/06* | (2009.01) | |
| *H04L 1/00* | (2006.01) | |
| *H04W 52/24* | (2009.01) | |
| *H04W 52/26* | (2009.01) | |

(52) U.S. Cl.
CPC ............. *H04W 52/06* (2013.01); *H04L 1/0003* (2013.01); *H04L 1/0009* (2013.01); *H04W 52/241* (2013.01); *H04W 52/262* (2013.01)

(58) Field of Classification Search
CPC ....................................................... H04L 1/0003
USPC ........................................................ 370/328
IPC ....................................................... H04L 1/0009
See application file for complete search history.

(56) References Cited

U.S. PATENT DOCUMENTS

| | | | |
|---|---|---|---|
| 6,490,727 B1 * | 12/2002 | Nazarathy et al. ............ | 725/129 |
| 2006/0291582 A1 | 12/2006 | Walton et al. | |
| 2010/0247107 A1 * | 9/2010 | Sadot et al. ................... | 398/140 |
| 2011/0249659 A1 * | 10/2011 | Fontaine et al. .............. | 370/338 |
| 2012/0309330 A1 | 12/2012 | Lamy-Bergot et al. | |

FOREIGN PATENT DOCUMENTS

WO      2007015962 A2     2/2007

* cited by examiner

*Primary Examiner* — Robert M Morlan
*Assistant Examiner* — Nourali Mansoury
(74) *Attorney, Agent, or Firm* — Baker & Hostetler LLP

(57) ABSTRACT

A method and system is provided for dynamic allocation of power required on a number n with n greater than 1 of an HF communication system, comprising an amplifier of maximum total power and at least one step in which the power and/or the modulation is managed on all the n pathways of said system so as to optimize a given probability of error termed the operating point for a maximum bitrate under the constraint of the total power imposed by the operation of said system.

12 Claims, 4 Drawing Sheets

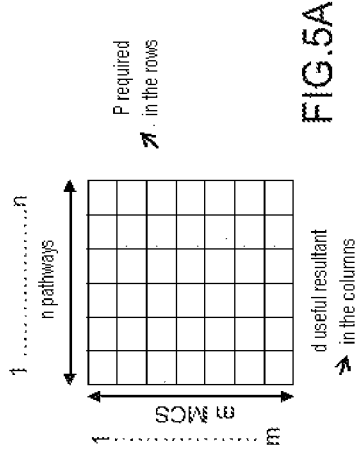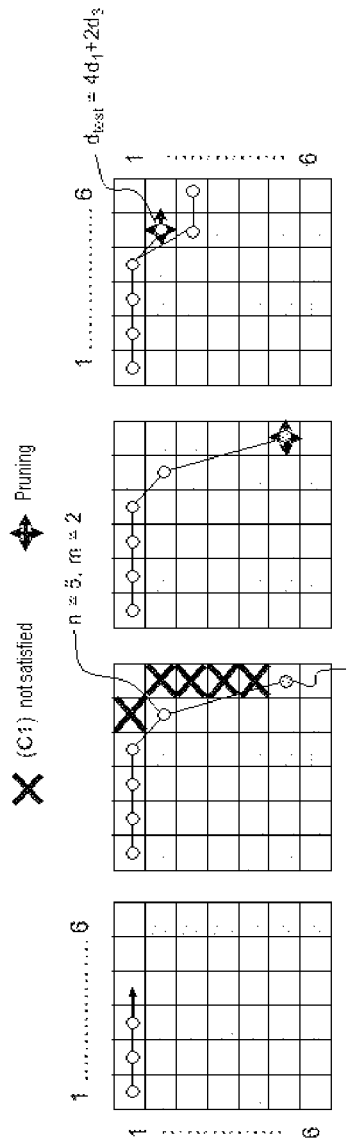

US 9,363,760 B2

METHOD AND SYSTEM ALLOWING THE DYNAMIC ALLOCATION OF POWER AND/OR OF MODULATION IN A SYSTEM COMPRISING N CHANNELS

CROSS-REFERENCE TO RELATED APPLICATIONS

This application is a National Stage of International patent application PCT/EP2012/069964, filed on Oct. 9, 2012, which claims priority to foreign French patent application No. FR 1103085, filed on Oct. 10, 2011, the disclosures of which are incorporated by reference in their entirety.

FIELD OF THE INVENTION

The invention relates notably to the field of radiocommunications in the high-frequency or HF frequency band at high bitrate, for example for a bitrate of greater than 19.2 kb/s, obtained for a system comprising several conventional channels or pathways (n) with 3 kHz of bandwidth. The method makes it possible to dynamically manage the allocation of power and/or modulation in a system comprising n channels under the given power constraint so as to maximize the total bitrate transmitted.

The terms "pathway" or "channel" will be used interchangeably in the present description. Likewise the expression "given power constraint" corresponds to the value of the power available for the operation of a system or to the power budget available in the system.

The HF frequency band envisaged goes, typically, from 2 MHz to 30 MHz.

BACKGROUND

HF linkups offer a non-line-of-sight capability which makes it possible to carry out communications at long or indeed very long distance without requiring recourse to a satellite.

The long-distance communication capability of HF linkups relies on the reflection of HF waves (2, 30 MHz) off the layers of the ionosphere, layers whose qualities are not stable over time and in space, thereby leading to strong variations of the propagation channel. To this instability of the channel are also added the presence of possible jammers, in particular at night where the passing HF spectrum is less significant and therefore more crowded.

Despite its instability, this channel exhibits the benefit of allowing long-distance communications without it being necessary to deploy a complicated or expensive infrastructure beforehand, in contradistinction to satellite communications for example.

Considering also its better stealth with respect to the satellite, this explains why it is currently sought to increase the bitrates offered on HF linkups.

In addition to the most customary uses according to the directives of various standards at frequency bands of width 3 kHz (so-called conventional HF channeling also referred to as SSB, and their standardized extension in the so-called LSB dual mode at 6 kHz known to the person skilled in the art that works on two adjacent channels, a solution has also been proposed in the Applicant's patent application entitled "Method and system for HF band adaptive communications, under the number US 2012/0309330, to consider employing a plurality (n) of such 3 kHz channels (contiguous or otherwise) so as to offer more significant useful bitrates to users of the HF band.

One of the problems to be solved within the framework of the use of a wider frequency band is that of the effective management of the power budget limited by the characteristics of the power amplifier of the transmitter system.

It is clearly apparent that when considering a plurality of channels distributed in a relatively wide band (e.g. 200 kHz), and when carrying out a wideband transmission alone capable of making it possible to attain a high bitrate (bitrates>32 kb/s), the various pathways distributed over this wide band will not see the same imperfections of the propagation channel: typically the fading will be different, and a fortiori the jamming, intentional or otherwise, will differ.

It is known from the prior art to use one and the same modulation scheme, for example, M-PSK, M-QAM known to the person skilled in the art, for two pathways, where the same code and interleaver is shared and finally where the power budget is equidistributed. One of the drawbacks of the prior art is of working on a typical value of two pathways, and of not having any means for optimizing the number of carriers or any indication of power distribution.

Patent application WO 2007/015962 discloses a method for performing multi-band transmissions.

Patent application US 2006/291582 describes a solution of adaptation to selective channels for transmission in a multiple input, multiple output system, better known by the abbreviation "MIMO". The idea is to use power adaptation to allow all the channels to see the same equivalent signal-to-noise ratio and therefore to use the same modulation for all the channels.

By taking account of a system comprising a maximum of n carriers corresponding to n pathways distributed in a given frequency band, the method according to the invention will seek to obtain the best distribution of the power budget available on these n carriers, so as to optimize the useful bitrate transmitted.

The technical problem posed is therefore, for a given power budget, to determine the corresponding optimal number of pathways and/or the corresponding choice of modulation and of coding, as well as the power distribution on each of the pathways so as to allow optimization of the highest possible useful bitrate, corresponding to the given operating point of the system.

The expression "given operating point" of a system is known to the person skilled in the art and corresponds to an operating point fixed by the user. This operating point is defined as the value of the signal-to-noise ratio at which provision is made to operate the system.

The useful bitrate is defined as the ratio of the number of user bits provided as input to the corrector code to the time required for their transmission. Similarly, the total bitrate is defined as the ratio of the total number of bits transmitted (coded bits and signaling bits) relative to the time required for their transmission.

SUMMARY OF THE INVENTION

The invention relates to a method of dynamic allocation of power required for each pathway of an HF communication system comprising a number n of pathways for signal transmission, the system comprising an amplifier of maximum total power $P_{tot}$, characterized in that it comprises at least one step in which the power and/or the modulation is managed on all the n channels of said system so as to optimize a given probability of error termed the operating point for a maximum bitrate $D_{max}$ under the constraint of the total power imposed by the operation of said system.

The subject of the invention relates to a method of dynamic allocation of power required for each channel of an HF communication system comprising a number n of channels for signal transmission, the system comprising an amplifier of maximum total power $P_{tot}$, characterized in that it comprises at least the following steps:
- a step of initializing the system in which m modulation schemes and a value of signal-to-noise ratio SNR are defined,
- a step where a value of power P nec required in order to attain the value SNR is determined as a function of a value of channel or pathway quality Qch obtained by return pathway,
- a step of classifying the various channels chn by decreasing level of Qch, generating a vector of n values (at the maximum) ordered in a decreasing manner, so that for a given modulation m the power required $P_m^j$ in order to transmit on channel j is less than or equal to $P_m^{j+1}$,
- a step where for each channel n, by using the value of Qch and the operating value of SNR, a matrix of power required for each modulation m considered is deduced and we obtain $P[P_i^j]$ where i varies from 1 to m modulations and j varies from 1 to n channels,
- for an identical modulation scheme used for all the n channels, a step of determining the number of channels to be used, by considering the matrix P row by row, by computing the power $P_i(k)=\Sigma_{j=1\ldots k}P_i^j$ and the value of the bitrate for a set of k channels, $d_i(k)=k\times d_i$ for k from 1 to n, k is the channel index, $d_i$=bitrate for the $i^{th}$ modulation, and the selection of a combination of the n channels offering a maximum total bitrate $D_{totmax}$ while complying with the total power constraint.

According to a variant embodiment, in the case where there exist m different coding schemes for the n channels, the method comprises at least the following steps:
- a step of initializing the system in which m modulation schemes and a value of signal-to-noise ratio SNR are defined,
- a step where a value of power P nec required in order to attain the value SNR is determined as a function of a value of channel or pathway quality Qch obtained by return pathway,
- a step of classifying the various channels chn by decreasing level of Qch, generating a vector of n values (at the maximum) ordered in a decreasing manner, so that for a given modulation m the power required $P_m^j$ in order to transmit on channel j is less than or equal to $P_m^{j+1}$,
- a step where for each channel n, by using the value of Qch and the operating value of SNR, a matrix of power required for each modulation m considered is deduced and we obtain $P[P_i^j]$ where i varies from 1 to m modulations and j varies from 1 to n channels,
- a step of determining the n possible channels and the allocation of the power consisting in maximizing the bitrate:

$$\max \sum_{j=1}^{n} \sum_{i=1}^{m} x_{i,j} d_j \text{ under the constraints}$$

$$(C_0) \text{ of integrity: } x_{i,j} \in \{0;1\}, \sum_{i=1}^{n} x_{i,j} = 1 \forall j$$

$$(C_1) \text{ of power: } \sum_{j=1}^{n} \sum_{i=1}^{m} x_{i,j} P_i^j \leq P_{tot}$$

knowing $P_j^i \leq P_j^{i+1} \forall i, j$ and $d_i > d_{i+1} \forall i$ where $d_i(k)=k\times d_i$ for k from 1 to n, k is the channel index, $d_i$=bitrate for the $i^{th}$ modulation.

According to a variant of the method, a test is conducted on the value of NbC of combinations, number for the class $C_{m+n-1}^n$, and for a sufficiently low value NbC deemed acceptable, the various powers required for each bitrate di are computed, starting from the maximum possible value $D_{max}$, and the computation is stopped as soon as the power constraint $C_1$ is satisfied.

The value of NbC of combinations, number for the class $C_{m+n-1}^n$ exceeding a fixed threshold value, the method comprises, for example, a step consisting in traversing the tree of possibles while undertaking prunings making it possible to reduce the complexity,
- one of these first simple prunings consists in considering the combinations existing between a bitrate $D_{fonc}$ defined as that desired by the system and a bitrate $D_{min}$ defined as an attainable bitrate, and then
- a number of combinations NbC'<NbC is determined,
- the number NbC' is thereafter compared with a threshold value, if NbC' is less than said threshold value then the method traverses the bitrates from $D_{fonc}$ until the first bitrate satisfying the power constraint.

According to a variant embodiment, the method traverses the tree of the possibilities of combinations while undertaking prunings by using the power constraint $C_1$ and by verifying the bitrate potential with respect to the best current bitrate.

For systems comprising several FEC error-correcting coding possibilities each with a series of possible modulations m, the method repeats the aforementioned steps of matrix deduction and of determining the number of channels to be used, for each series of modulations serving its corrector code and compares the results for each FEC configuration, so as to adopt the configuration of modulation and of coding giving the highest bitrate.

The method comprises, for example, a step of post-correction in the allocation of power and of optimization as a function of the value of the power budget when the optimal power budget $P_{opti}$ found is strictly less than the available real budget $P_{real}$, the method will transmit at the optimal budget $P_{opti}$ found, so as to limit the power transmitted.

The method can comprise a step of post-correction in the allocation of power and of optimization as a function of the value of the power budget when the optimal power budget $P_{opti}$ found is strictly less than the available real budget $P_{real}$, the method will allocate the remainder of power budget available on the various channels selected, so as to improve their operating margin.

According to a variant the value of $P_{tot}$ is corrected with a backoff factor corresponding to the modulations found and the steps of the method according to the invention are repeated.

The steps of the method are repeated when the information on the quality Qch of the link evolves.

The invention also relates to a system making it possible to manage the allocation of power and/or of modulation on various pathways for wideband HF communications, characterized in that it comprises in combination at least the following elements:
- an HF transmitter comprising n transmission pathways, with n greater than 1, in the HF band,
- a receiver R comprising means for receiving a set of n selected frequency channels and means for determining the quality of a channel,
- a return pathway allowing the transmission of the item of information regarding the quality of the channel to the transmitter, said system comprising means for implementing the steps of the method according to the invention.

BRIEF DESCRIPTION OF THE DRAWINGS

Other characteristics and advantages of the present invention will become more apparent on reading the description of one or more exemplary embodiments offered with regard to the figures which represent.

DETAILED DESCRIPTION

To summarize, the method according to the invention, several examples of which will be given in the subsequent description, comprises the dynamic definition of the allocation of the power required per channel or pathway and/or of the allocation of the modulation under the condition of maximizing the total useful bitrate transmitted.

The idea implemented is to take advantage of the fact that the carriers do not see identical propagation channels and therefore do not have the same power needs. This is all the truer when different modulations are employed on the various pathways. The method will therefore seek to define the best solution in terms of number of carriers and of power level assigned to each so as to succeed in transmitting the highest possible useful bitrate.

Figure 1:
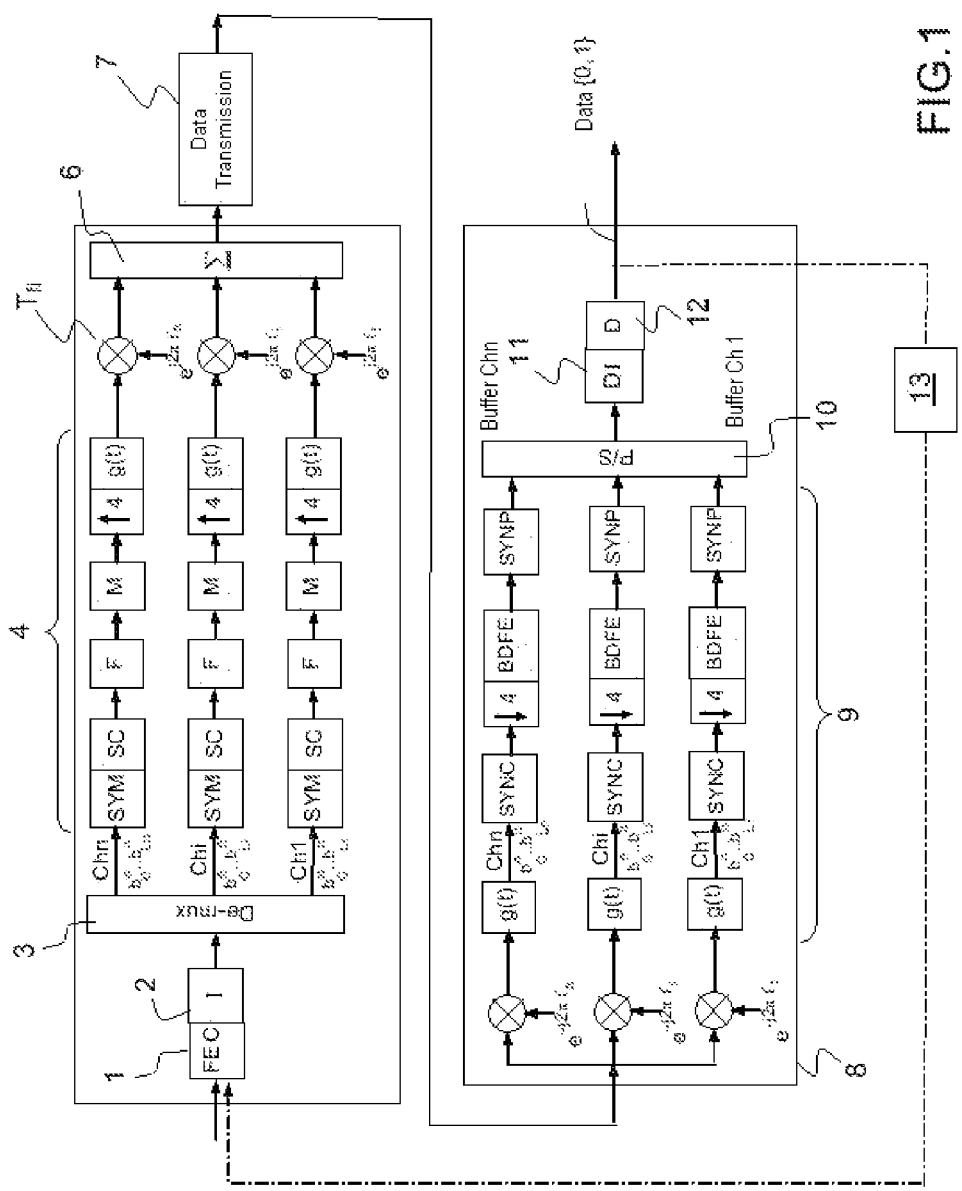
FIG. 1, an exemplary structure of a system allowing the implementation of the method, FIG. 2, an exemplary algorithm for the sequencing of the steps of the method according to the invention, FIG. 3, a representation of the classification of the pathways by decreasing level of quality, FIG. 4, an illustration of a first exemplary implementation of the method, FIGS. 5A, 5B, 5C, 5D, 5E, a second exemplary implementation of the method according to the invention using a tree-like traversal, and FIG. 6, the shaping of the signal as output of the transmitter-receiver system according to the invention.

FIG. 1 represents an exemplary diagram of a radio transmitter/receiver comprising the following elements.

At the level of the transmitter part of the system; the binary data {0, 1} of the user pass firstly into a correction module 1, FEC, and then into an interleaver 2, before being demultiplexed 3. The demultiplexed data are thereafter transmitted on n parallel channels ch1, . . . chn. Then channels are, for example, channels of width 3 KHz that may or may not be contiguous.

The data after processing in the transmit chain 4 consisting of a module for forming symbols SYM, of a SYM scrambling module, of a module for framing, modulation M and filter g(t) are summed 6, and then transmitted via a channel 7 to a receiving part of the radio transmitter/receiver.

At the level of the receiver part R, the signal received is initially frequency transposed T'fi, 8, thereby allowing separation of the data on the n channels chn, and then the data are transmitted into a processing chain 9 which processes the data on n channels in parallel before reassembling them at the level of a parallel series buffer 10 and then transmitting the whole to a deinterleaver 11 symmetric to the interleaver of the transmitter part. After deinterleaving, the data are transmitted to a corrector decoding module 12 which provides binary data {0, 1}.

At the level of the reception chain, the processing chain 9 comprises elements known to the person skilled in the art, notably a synchronization module SYN for each of the pathways, an equalization module BFDE, followed by a synchronization prediction module SYNP.

The system also comprises a return pathway 13 making it possible to collect the quality of the propagation channel for the various possible channels for transmission, capable of informing the system of the quality of the propagation channel for each of the channels. This information regarding channel or pathway quality Qch is bundled into a set S.

In order to obtain an item of information on the quality Qch of a channel or propagation pathway, it is possible to use the technique described in the Applicant's aforementioned patent application US 2012/0309330. Thus, it is possible to obtain information regarding quality corresponding to a noise power or to a signal ratio which is transmitted by the receiver to the transmitter, on the basis of measurements carried out in reception either on the signal-to-noise ratio estimated, for example on pilot symbols of the received frame, or for the channels where there is no traffic, by integration of the noise over the sub-band considered. In practice, these measured values will be converted into a discrete value taken from the predefined set S of values grading the link. For example, the power of the received signal is measured in the absence of transmission in each channel. This measurement is performed by the receiver with an analog-digital converter (not represented in the figure since it does not form part of the invention) of known dynamic swing and saturation value. The transmission quality score can also take into account a value of mean power of the signal in the course of a past time period. This mean power is utilizable solely if its measurement is carried out over a time period for which the transmit and receive conditions are comparable to those observed for the measurement of the instantaneous power of the signal. It is also possible to weight the measurement of the instantaneous power of the signal, by preferential allocations to various services. For example, if there are frequencies assigned on a custom basis and others in shared access, it will be possible to favor the use of the custom frequencies.

Before describing the steps implemented by the method according to the invention, the conditions required for implementation will be set out: Let n be the maximum number of channels used in the total frequency band of the signal;

$P_{tot}$ be the maximum total power that the amplifier (not represented) of the transmit chain can provide. This power takes account of the optional backoff factor necessarily introduced to protect the amplifier used in multi-carrier mode;

m be the number of modulation (and coding) schemes that can be considered on each pathway or channel. These schemes are classed in descending order of bitrates $d_i$, that is to say $d_i > d_{i+1}$ i=1 . . . $m^{-1}$, d1>d2 . . . $d_{m-1}$.

The modulation and coding schemes are ordered logically, namely that solutions are considered for which there are bitrates decreasing inversely with the signal-to-noise ratio required in order to attain an operating point of the system.

In the case where, in an approach of LSB (lower side band) type, the corrector code is shared between the pathways or channels, only the modulation scheme is variable channel by channel (coded modulations also being envisagable on one or more of the various channels), the corrector coding being shared between the pathways.

On the other hand, it is possible to envisage several possibilities of FEC corrector code in the parameters of the system. Each FEC corrector code is then considered with its series of possible modulations; in this case, the algorithm described hereinafter will be relaunched for each series of modulations serving its corrector code, and the results obtained for each FEC configuration will thereafter be compared so as to conclude with regard to the solution offering the best bitrate while complying with the imposed constraints, notably the available power or the available power budget.

One of the objectives of the method and of the system according to the invention is to attain a given probability of error (so-called operating point of the system) for a maximum useful bitrate (so as to obtain the most effective possible service) under the constraint of the imposed total power. It will be noted that the approach will remain valid if it is desired to attain a given bitrate $D_{max}$, as detailed further on.

Figure 2:
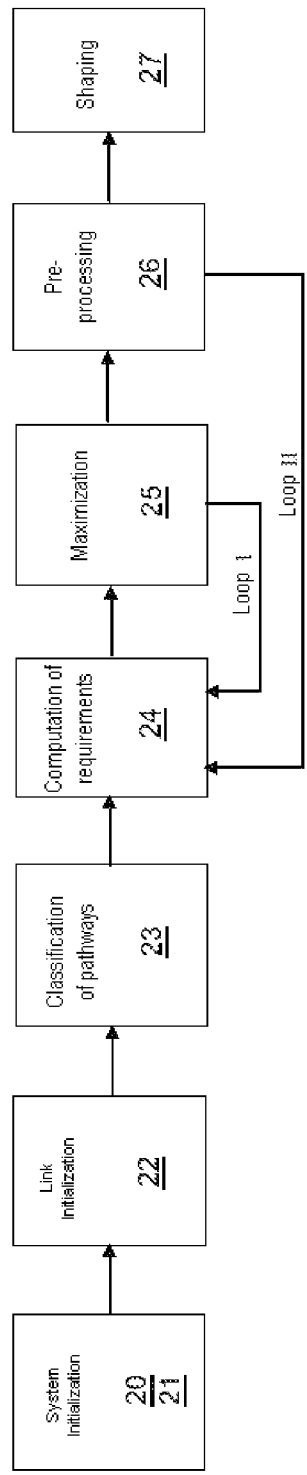

FIG. 2 illustrates the various steps of the method according to the invention. The first steps 20, 21 are system initialization steps carried out once and for all and integrated into the system information, and then comes a step 22 of initializing the link (establishment of the communication and transmission), which is carried out just once at the start of each link, and finally the recurrent steps 23, 24, 25, 26 carried out whenever the parameters of the communication (quality of the transmission channel, for example) of the system change, and therefore notably whenever the quality information transmitted by the return pathway changes.

Steps of Initializing the System

The first step Step 20 consists in establishing, for each of the m coding schemes considered and for a channel model considered, the value SNR of the minimum signal-to-noise ratio which makes it possible to guarantee the target error probability. This implements mechanisms known to the person skilled in the art.

In the case where the system comprises several target operating points (for example an operating point for speech, and an operating point for data transmission), the method will define the signal-to-noise ratio SNR required per operating point. The values corresponding to the type of use concerned will then be used subsequently.

Next a second step of initializing the system Step 21, consists in defining the set of possible combinations of modulation and coding schemes. In practice, the method considers an unordered combinatorics, the final order of the pathways or channels n not being significant here since they will be classed thereafter according to the needs of the user.

The useful bitrates $d_{ut}$ offered by each of the combinations of modulation and coding schemes of at most n pathways or channels are then classed by decreasing useful bitrates $d_{ut}$, to give a vector D of size NbC. This vector contains the item of information regarding the useful bitrate $d_{ut}$ offered, regarding the number N of channels used as well as the item of information regarding the combination of modulation (and coding) scheme making it possible to attain it. It will be noted that for m configurations of modulations and a maximum of n pathways, a value of NbC of the class $C_{m+n-1}^n$ is obtained.

According to one embodiment, it is also possible to reduce the value of NbC by prohibiting certain combinations, as has for example been chosen in LSB mode for which the standard defines only some of the possible bitrates defined for Single Side Band SSB.

Step of Initializing the Link

Once the system has been initialized, the method will implement a first step of initializing the link, Step 22, which will consist in establishing for the equipment used (as a function therefore of its precise characteristics, of the link considered, etc.) various values of powers P required in order to attain their SNR operating point, as a function of the various possible values of quality Qch of propagation channel that can be provided by the return pathway 13. Let S be the set of these envisaged values of quality of the propagation channel, and |S| be the cardinal of this set.

This step of computing the $|S|^m$ values makes it possible notably for the computation of the vector of the required powers $P_{nec}$ not to have to be redone each time, where m is the number of modulations. It is also possible to decide to recompute at each iteration solely the m×n required powers, with m the number of possible modulations and n the number of channels considered.

These preliminary steps having been carried out, the method will thereafter execute a recurrent phase corresponding to the steps described hereinafter and repeated whenever new information, notably on the quality of a link, is obtained at the level of the transmitter by the return pathway.

In the absence of new information regarding quality and any modification in the system, the same transmission parameters will be used. On the other hand, faced with a modification in the system (for example a change of type of transmission), there may be cause to relaunch the step of initializing the link 22.

Recurrence Steps

Figure 3:
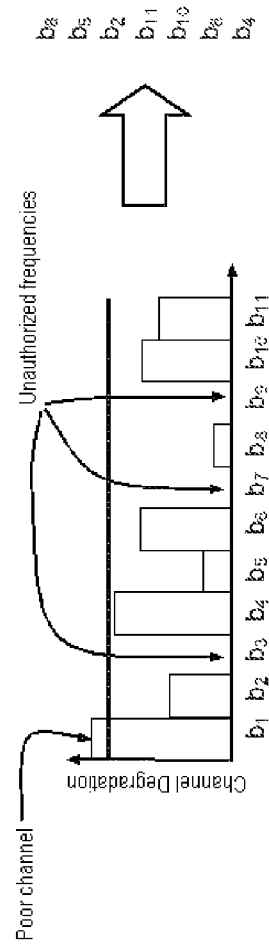

The first step of the recurrence phase, Step 23, consists, notably, in establishing a classification of the various possible pathways by decreasing level of quality Qch as a function of the received measurements of quality. This approach is illustrated by FIG. 3, in a chart whose ordinate axis corresponds to the degradation of the channel and whose abscissa axis corresponds to authorized or unauthorized frequencies, showing that certain pathways associated with a frequency b1 can be eliminated since they are prohibited b4, b9, (frequencies not authorized in transmission corresponding to the channels or pathways Ch4, Ch9), or too bad, for example b1 corresponding to a value of quality situated beyond a level deemed unacceptable. At the end of this step 23 the method generates a vector V of n values (at the maximum) ordered in a decreasing manner, namely that for each modulation m considered, the power required $P_m^j$ to transmit on channel j will be less than or equal to the power $P_m^{j+1}$ to transmit on channel j+1.

Next during a second Step 24, for each of these n channels corresponding to the authorized frequencies ordered in the previous step, the method will deduce from the value of the channel quality Qch obtained through the item of information regarding quality obtained through the return pathway 13 and from the value of the operating signal-to-noise ratio SNR of the system, the power $P_{nec}$ required for each modulation scheme m and coding envisagable. This defines the power matrix $P=[P_i^j]_{i=1\ldots m, j=1\ldots n}$ which therefore satisfies the above-mentioned constraints $P_i^j \leq P_i^{j+1}$ for every j=1 . . . n−1, i:1 . . . m. Each row of the matrix corresponds to the transmission of the bitrate $d_i$ with by construction the relation $d_i > d_{i+1}$ i=1 . . . m−1:

$$P = \begin{bmatrix} P_1^1 & \ldots & P_1^n \\ P_2^1 & \ldots & P_1^n \\ & \vdots & \\ P_m^1 & \ldots & P_m^n \end{bmatrix}$$

Considering for simplicity that the last row (modulation and coding scheme number m) corresponds to the absence of transmission (i.e. a zero bitrate and a zero power), it is therefore possible to work while always considering a transmission with n channels, certain channels being optionally associated with a power $P_m^{j+1}=0$ and with a bitrate $d_i=0$.

Two variants of implementation of the method for the recurrent part will be described in relation to FIGS. 4 and 5 depending on whether or not the modulation and coding schemes m are identical on the n channels.

Figure 4:
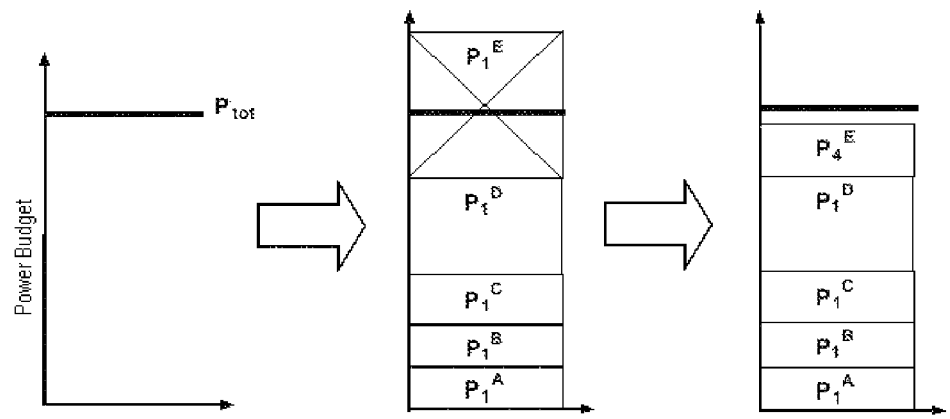

According to a first implementation variant, FIG. 4, the same modulation and coding scheme is used for each of the pathways. The problem simplifies and the method will determine the number n of pathways or channels to be used as well as the power allocated per pathway or channel i.e. a maximum of n*m cases with m the modulation.

The method considers row by row (i.e. for a given modulation and coding scheme considered) the matrix P by computing the power $P_i(k)=\Sigma_{j=1\ldots k}P_i^j$ and the value of the bitrate for a set of k channels, $d_i(k)=k\times d_i$ for k from 1 to n, k is the channel index, $d_i$=bitrate for the $i^{th}$ modulation, and adopts as solution the combination offering the maximum total bitrate while complying with the total power constraint. Let $D_{totmax}$ be this solution, it corresponds to the bitrate adopted for the case where the same modulation scheme m exists on the various pathways or channels n.

In FIG. 4, the total power budget is Ptot, the method allocates the power budget by priority to the pathways exhibiting the best propagation conditions, i.e. in the order $b_8$ $b_5$ $b_2$ $b_{11}$ $b_{10}$ $b_6$ $b_4$=A B C D E F.

According to a second implementation variant described in FIG. 5, in the case where different modulation and coding schemes are used on each channel n, the method will execute a step which consists in maximizing the bitrate under constraints, that is to say in solving a problem with n*m unknowns under two constraints, on the one hand a total power constraint $P_{tot}$ for the system, and on the other hand a constraint of defining a single power $P_i^j$, power for channel j and modulation i, to be considered per pathway or channel n.

This second constraint can be formalized by means of variables $x_{i,j}$ making it possible to impose an integrity constraint, that is to say that one and only one of the powers $P_i^j$, power for channel j and modulation i, will be considered per row at the level of the power matrix, with di: the bitrate for the modulation i=1 . . . m, Ptot the total power budget for the system $$\max \sum_{j=1}^{n} \sum_{i=1}^{m} x_{i,j}d_j \text{ under the constraints:}$$

$$(C_0) \text{ of integrity: } x_{i,j} \in \{0;1\}, \sum_{i=1}^{n} x_{i,j} = 1 \forall j$$

$$(C_1) \text{ of power: } \sum_{j=1}^{n} \sum_{i=1}^{m} x_{i,j}P_i^j \leq P_{tot}$$

knowing $P_j^i \leq P_j^{i+1} \forall i, j$ and $d_i > d_{i+1} \forall i$

This approach makes it possible, notably in the case of significant values m and n, not to have to test a very significant number NbC, for example, $C_{m+n-1}^n=6435$ in the case where m=8 and n=8.

If the value of NbC is deemed sufficiently low for it to be possible to conduct the whole set of tests in the time allotted or with an acceptable complexity (factors dependent on the equipment, the computational capabilities, etc.), the problem can be solved by computing the powers required for each bitrate di, optionally starting from a possible minimum bitrate value computed elsewhere, for example by using the methodology described for the case where all the channels employ the same modulation and coding scheme. The computation is stopped as soon as the power constraint $C_1$ is satisfied, since the constrained total power problem is then solved in an optimal manner for the system.

If the value of NbC is deemed too significant for it to be possible to conduct the whole set of tests in the time allotted or for an acceptable consumption (in particular when considering portable equipment), so as to find the optimal combination (bitrates-modulations-number of channels used), the method will traverse the tree of possibles while undertaking prunings making it possible to reduce the complexity; this is represented in FIGS. 5A-5D.

One of the first simple prunings consists in not considering the NbC combinations but in considering the combinations existing between a bitrate $D_{fonc}$ defined as that desired by the system (a priori the bitrate D for example described in the aforementioned patent application US 2012/0309330, except if in practice the applicative layers do not provoke sufficient traffic) and a bitrate $D_{min}$ defined as an attainable bitrate: in practice, it is possible to take as value the bitrate $D_{totmax}$, defined hereinabove.

One then obtains (after having rapidly located $D_{fonc}$ and $D_{min}$ in the vector D by virtue of a search in D, for example dichotomy based, a procedure known to the person skilled in the art) a number of combinations NbC'<NbC which, if it is deemed acceptable, that is to say of a complexity not exceeding the capabilities of the equipment with respect to the time allotted to conduct this computation, will make it possible to solve the problem by traversing the bitrates from $D_{max}$ until the first bitrate satisfying the power constraint.

If NbC' is still deemed too high, the method will use pruning steps represented in FIG. 5 which uses the significant scheduling of the matrix P, so as to prune to the maximum branches of the tree of possibles that will be traversed in the matrix P.

In detail, the traversal of the matrix of required powers relies on the principle of pruning the tree by detecting the modulation-coding configurations MCS which do not comply with $C_1$ the power constraint and which cannot offer a better total bitrate than the bitrate obtained by the current configuration. This is guaranteed by the rules for traversing the power matrix which has been constructed as a function of the aforementioned bitrates/power scheduling rules.

Accordingly, the method will, for example, execute the traversal steps represented with FIGS. 5A, 5B, 5C, 5D.

Initialization of the Variables:

Parameters of the current optimal configuration: aggregate bitrate $d_{curr}=0$; vector of chosen modulations $m_{curr}=(0, \ldots 0)_{0 \ldots m}$ (a virtual modulation $m_0$ is introduced here to make it possible to effect the loop over the modulation comparisons between the current and the previous column without having to single out the processing of the first column);

Parameters of the configuration currently under test: aggregate bitrate $d_{test}=0$;

vector of tested modulations $m_{test}=(0, \ldots 0)_{0 \ldots m}$;

First traversal of the tree (illustrated by the steps in FIGS. 5B and 5C):

For I varying from 1 to n, number of channels, the various channels are traversed in increments of 1, Select $m_{test}(I)$, the best value of modulation and coding scheme (corresponding to the highest bitrate) compatible with the power constraint $C_1$ and taking account of the impossibility of selecting an unordered modulation on account of the procedure for constructing the matrix of powers:

$$m_{test}(l) = \min_{i=m_{test}(l-1) \ldots m} (i) \left| \sum_{j=1}^{l-1} P^j_{m_{test}(j)} + P^l_i \leq C_1 \right.$$

Update the bitrate of the test configuration:

$$d_{test} = \sum_{j=1}^{l} d_{m_{test}(j)}$$

where $d_{mtest}(j)$ is the bitrate for the $m_{test}(j)^{th}$ modulation.
End of the loop over I; the chosen channels have been traversed: we define with the solution obtained for the test values the first current combination of solutions for the bitrate and the modulation: $d_{curr}=d_{test}$; and for j=1 . . . n, $m_{curr}(j)=m_{test}(j)$.

Traversal Through the Tree with Pruning:

At the start of this step, the test configuration is equal to the current configuration subsequent to the previous step. The possibilities will be traversed selectively so as to determine whether there would still be a combination making it possible to attain a greater bitrate than the current bitrate while complying with the power constraint.

For k varying from n−1 to 1 in increments of 1, loop over the channels

For p varying from $m_{test}(k)+1$ to m, loop over the modulations

Pruning of the test configuration into the next configuration to be tested (illustrated by steps 5C and 5D of FIG. 5): $m_{test}(k)=p$; and for j=k+1 . . . n, $m_{test}(j)=0$.

Computation of the maximum possible bitrate of the test configuration, corresponding to employing the modulation $m_{test}(j)$ for the set of following channels:

$$d_{test\ max} = \sum_{j=1}^{k} d_{m_{test}(j)} + (n-k) \times d_{m_{test}(k)}.$$

If $d_{testmax}$ is less than the current bitrate ($d_{testmax}<=d_{curr}$), the loop is exited and the current configuration is adopted.

Otherwise, we continue by selecting, for l varying from k+1 to n in increments of 1, the best values $m_{test}(l)$ of modulation and coding scheme that are compatible with the power constraint $C_1$ and that take account of the impossibility of selecting an unordered modulation on account of the procedure for constructing the matrix of the powers:

$$m_{test}(l) = \min_{i=m_{test}(l-1) \ldots m} (i) \left| \sum_{j=1}^{l-1} P^j_{m_{test}(j)} + P^l_i \leq C_1 \right.$$

In a variant, at each value of I, it will also be possible to test whether the maximum possible bitrate of the test configuration always exceeds $d_{curr}$, in order to exit the loop over I more rapidly, so as to eliminate the configuration currently under test in the converse case.

At the end of the loop over I, the bitrate of the test configuration is then updated:

$$d_{test} = \sum_{j=1}^{n} d_{m_{test}(j)},$$

and it is compared with the bitrate of the current solution: if $d_{curr}<d_{test}$; the current solution is replaced with the current solution (optionally it will be possible to replace it if $d_{curr}=d_{test}$ and if the power required for the solution currently under test is less than that for the current solution), i.e.: for j= k . . . n, $m_{curr}(j)=m_{test}(j)$.

End of the loop over p: the whole set of possibilities corresponding to modifications of the $k^{th}$ column of the matrix has been traversed, we therefore go to the previous column.

End of the loop over k: the whole set of configurations that can make it possible to attain a bitrate greater than $d_{curr}$ has been considered. We therefore stop. The current configuration is the one which is adopted.

An example is given in conjunction with FIGS. 5A, 5B, 5C, 5D and 5E for 6 channels and 6 modulations and the modulation 0: after the initializations, the computation of the first solution is done in the steps of FIGS. 5B and 5C with in FIG. 5B the test bitrate equal to $3d_1$ (bitrate for modulation No. 1).

In FIG. 5C, $d_{test}=4\times d_1$, and then the method compares the power value required so as to have the bitrate $d_1$ on the fifth channel and finds that this does not make it possible to satisfy the constraint $C_1$. Modulation no. 2 is then considered, which, in the case of the example considered, makes it possible to satisfy the power constraint: the method therefore continues by carrying out $d_{test}=4\times d_1+d_2$. The cross in the matrix (FIG. 5C) here indicates that the condition $C_1$ is not satisfied. The method proceeds until the last row where it is noted that it is required to attain $m_{test}(6)=6$ in order to satisfy the constraint $C_1$ again. We have therefore obtained a first configuration which has entered as current configuration.

The following pruning step will then proceed, as illustrated by FIGS. 5D and 5E: the values of the $n^{th}$ column ($6^{th}$ column) are pruned, and that of the n−$1^{th}$ is decreased by one modulation. The process then proceeds under the power constraint and a new configuration is obtained, corresponding to the test bitrate dtest=$4\times d_1+2\times d_3$ which in the example is greater than the current configuration. The current configuration is therefore updated. The pruning loops continue but in the example no further cases are found where the maximum bitrate can exceed the current bitrate; the algorithm is therefore exited.

Subsequent to these steps, in the case where the corrector codes vary, a loop II taking into account the FEC code variation is executed, which implies that the method will run the algorithm for each case of FEC code and adopt the modulation and coding configuration giving the highest bitrate. This is illustrated by the loop I which exits at step 25 to return to step 24.

According to an implementation variant, the method can comprise a step 26 which corresponds to a Post-correction on the power allocation and to the updating optimization loop II as a function of the value of the total power or power budget. The loop II then restarts in step 24.

This loop II may notably be implemented when it is noted that the optimal power budget $P_{opti}$ found is strictly less than the available real budget $P_{real}$. It will then be possible to choose either to transmit at the optimal budget $P_{opti}$ found and therefore to consume less power, or to add a further step corresponding to allocating the remainder of power budget available on the selected channels, so as to improve their operating margin. An allocation as per the already allocated budgets for example may be considered.

Another correction could also be envisaged by virtue of this loop II, which makes it possible to finely adapt the computation of the total power $P_{tot}$ as a function of the backoff factor. Indeed, as known to the person skilled in the art, the level of backoff factor can vary with the number of pathways and the type of modulations employed. Therefore, a value of backoff factor that is higher than required may have initially been adopted to compute $P_{tot}$. If such is the case, it is then possible either to agree to preserve a potentially sub-optimal solution and make a post-correction as detailed hereinabove, by reallocating the remaining budget, or to relaunch the algorithm with a $P_{tot}$ corrected with the reduced backoff factor. If the solution found with this new total power value remains compatible with the new maximum power, it is then the optimal solution, on the other hand if it leads to a new backoff factor, the user may be amended to repeat the process, stopping for example after a maximum of 2 tests.

Figure 6:
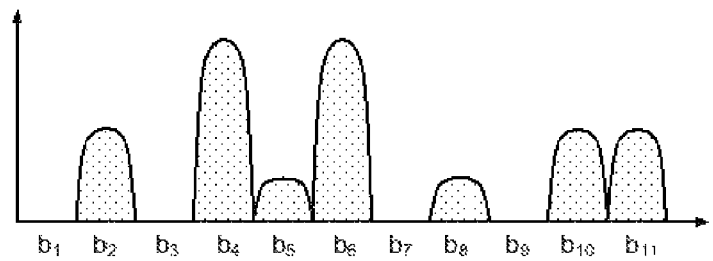

The following step, step 27, represented in FIG. 6, can consist in applying the combination found for the next transmission phase (typically onwards of the next opportunity for the station to transmit data), with shaping of the signal in preparation for the power distribution decided before entry to the power amplifier of the transmitter.

A possibility consists in introducing a guarantee of protection against intermodulations by ensuring a fixed maximum difference Δ (typically 20 dB) of gap between the strongest and the weakest carriers.

Advantages

The method and the system according to the invention exhibit notably the advantage of being compatible with existing systems. The transmitter can be modified to ensure different power levels on the various sub-carriers without contravening a standard, and the receiver, seeing different power levels, will process them the way it might be led to process different fadings related to the propagation channel.

The invention allows fine management of the power budget by allowing it to be distributed unevenly over the set of pathways.

The proposed approach makes it possible to define the best combination of power and of modulation and coding schemes in order to maximize the useful bitrate transmitted.

The invention claimed is:

1. A method of dynamic allocation of power required for each channel of a High Frequency (HF) communication system including an n number of channels for signal transmission and an amplifier of maximum total power ($P_{tot}$), the method comprising:
    a step of initializing the communication system in which m modulation schemes are defined, and a value of a minimum signal-to-noise ratio (SNR) which guarantees a target error probability established for each of the m modulation schemes defined and for a channel model considered for a signal transmission,
    a step where a value of power required in order to attain the value of the SNR is determined as a function of a value of a channel or a pathway quality (Qch) obtained by a return pathway for the signal transmission,
    a step of classifying various channels by decreasing a level of the Qch, generating a vector of n values ordered in a decreasing manner, so that for a given modulation in the m modulation schemes, the power required $P_m^j$ in order to transmit on a channel j is less than or equal to $P_m^{j+1}$, where j varies from 1 to at a maximum of n channels and to eliminate channels in the various channels having unauthorized frequencies for transmission or having a value of quality lying beyond a level deemed unacceptable,
    a step where for each channel n, by using the value of the Qch and an operating value of the SNR, a power matrix $P=[P_i^j]_{i=1\ldots m, j=1\ldots n}$ is deduced, satisfying $P_i^j<=P_i^{j+1}$ for all j=1 ... n−1, i:1 ... m, a row of the power matrix corresponds to the signal transmission of a bitrate $d_i$ by a construction of a relation $d_i>d_{i+i}$ i=1 ... m−1, where i varies from 1 to m modulations and j varies from 1 to n channels,
    for an identical modulation scheme used for all the n channels, a step of determining a number of channels to be used, by considering the power matrix P row by row, by computing a power $P_i(k)=\Sigma_{j=1\ldots k}P_i^j$ and the bitrate for a set of k channels, $d_i(k)=k\times d_i$ for k from 1 to n, k is a channel index, $d_i$=bitrate for an $i^{th}$ modulation, and a selection of a combination of the n channels offering a maximum total bitrate $D_{totmax}$ while complying with a total power constraint.

2. The method as claimed in claim 1, wherein for systems comprising several forward error-correcting (FEC) coding possibilities each with a series of possible modulations m, the method repeats steps for each series of modulations serving a corrector code and compares results for each FEC configuration, to adopt the FEC configuration of the modulation and of a coding giving a highest bitrate.

3. The method as claimed in claim 1, further comprising a step of post-correction in an allocation of power and of optimization as a function of a value of a power budget when an optimal power budget ($P_{opti}$) found is strictly less than an available real budget ($P_{real}$), the method will transmit at the optimal power budget ($P_{opti}$) found, to limit a power transmitted.

4. The method as claimed in claim 1, further comprising a step of post-correction in an allocation of power and of an optimization as a function of a value of a power budget when an optimal power budget ($P_{opti}$) found is strictly less than an available real budget ($P_{real}$), the method allocates a remainder of a power budget available on various channels selected, to improve an operating margin.

5. The method as claimed in claim 1, wherein the value of the $P_{tot}$ is corrected with a backoff factor corresponding to the modulations found and said initializing, said value of the power is determined, said classifying, said deducing the power matrix, and said determining the number of channels are repeated.

6. The method as claimed in claim 1, wherein the steps of the method are repeated when an information on the quality Qch of a link evolves.

7. A method of dynamic allocation of power required for each channel of a High Frequency (HF) communication system including an n number of channels for signal transmission, and an amplifier of maximum total power ($P_{tot}$), wherein the communication system uses m different coding or modulation schemes for the n number of channels, the method comprising:
    a step of initializing the communication system, in which m modulation schemes are defined and a value of a minimum signal-to-noise ratio (SNR) which guarantees a target error probability established for each of the m modulation schemes defined and for a channel model considered for a signal transmission,
    a step where a value of power required in order to attain the value of the SNR is determined as a function of a value of a channel or a pathway quality (Qch) obtained by a return pathway for the signal transmission, a step of classifying various channels by decreasing a level of the Qch, generating a vector of n values at most, ordered in a decreasing manner, so that for a given modulation in the m modulation schemes, a power required $P_m^j$ required in order to transmit on a channel j is less than or equal to $P_m^{j+1}$, a step where for each channel n, by using the value of the Qch and an operating value of the SNR, a matrix of power required for each modulation m defined is deduced and a power matrix $P[P_i^j]$ is obtained, where i varies from 1 to m modulations and j varies from 1 to n channels, a step of determining n possible channels and an allocation of the power required for maximizing a bitrate under constraints:

$$\max \sum_{j=1}^{n} \sum_{i=1}^{m} x_{i,j} d_j \text{ under the constraints:}$$

$$(C_0) \text{ of integrity: } x_{i,j} \in \{0; 1\}, \sum_{i=1}^{n} x_{i,j} = 1 \forall j$$

$$(C_1) \text{ of power: } \sum_{j=1}^{n} \sum_{i=1}^{m} x_{i,j} P_i^j \leq P_{tot}$$

knowing: $P_i^j \leq P_j^{j+1} \forall i, j$ and $d_i > d_{i+1} \forall i$ where $d_i(k)=k \times d_i$ for k from 1 to n, k is a channel index, $d_i$=bitrate for an $i^{th}$ modulation.

8. The method as claimed in claim 7, wherein a test is conducted on a value of combinations, a number of a class $C_{m+n-1}^n$, and for a sufficiently low minimum value of the combinations deemed acceptable, various powers required for each bitrate di are computed, starting from a maximum possible value $D_{max}$, and ending as soon as the power constraint $C_1$ is satisfied.

9. The method as claimed in claim 7, wherein the value of combinations, a number of a class $C_{m+n-1}^n$ exceeding a fixed threshold value, the method comprises a step of traversing a tree of possibles while undertaking prunings to reduce a complexity, a first simple prunings includes considering the combinations existing between a bitrate ($D_{fonc}$) defined as that desired by the communication system and a bitrate $D_{min}$ defined as an attainable bitrate, and then a number of combinations less than the value of combinations is determined, the number of combinations is thereafter compared with a threshold value, if the number of combinations is less than said threshold value then the method traverses bitrates from the $D_{fonc}$ until a first bitrate satisfying the power constraint is found.

10. The method as claimed in claim 7, wherein the method traverses a tree of possibilities of combinations while undertaking prunings by using the power constraint $C_1$ and by verifying a bitrate potential with respect to a best current bitrate.

11. The method as claimed in claim 7 wherein the value of Ptot is corrected with a backoff factor corresponding to the modulations found and said initializing, said value of the power determined, said classifying, said deducing of the matrix of power, and said determining of the n channels are repeated.

12. A system to manage an allocation of power and/or of modulation on various pathways for wideband High Frequency (HF) communications, comprising:

an HF transmitter configured to transmit an item of information to one or more of n transmission pathways, with n greater than 1, in an HF band, a receiver R comprising means for receiving the item of information over a set of n selected frequency channels and means for determining a quality of a channel, a return pathway allowing a transmission of the item of information regarding the quality of the channel to the HF transmitter, said system comprising means for implementing:

a step of initializing the communication system in which m modulation schemes are defined, and a value of a minimum signal-to-noise ratio (SNR) which guarantees a target error probability established for each of the m modulation schemes defined and for a channel model considered for the transmission, a step where a value of power required in order to attain the value of the SNR is determined as a function of a value of a channel or a pathway quality (Qch) obtained by the return pathway for the transmission, a step of classifying various channels by decreasing a level of the Qch, generating a vector of n values ordered in a decreasing manner, so that for a given modulation in the m modulation schemes, a power required $P_m^j$ in order to transmit on a channel is less than or equal to $P_m^{j+1}$ where j varies from 1 to at a maximum of n channels and to eliminate channels in the various channels having unauthorized frequencies for transmission or having a value of quality lying beyond a level deemed unacceptable, a step where for each channel n, by using the value of the Qch and an operating value of the SNR, a power matrix $P=P_i^j{}_{i=1...m, j=1...n}$ is deduced, satisfying $P_i^j <= P_i^{j-1}$ for all j=1 ... n-1, i:1 ... m a row of the power matrix corresponds to the signal transmission of a bitrate $d_i$ by a construction of a relation $d_i > d_{j+1}$ i=1 ... m-1, where i varies from 1 to m modulations and j varies from 1 to n channels, for an identical modulation scheme used for all the n channels, a step of determining the number of channels to be used, by considering the power matrix P row by row, a power $P_j(k) = \Sigma_{j=1...k} P_i^j$ and the bitrate for a set of k channels, $d_i(k) = k \times d_i$ for k from 1 to n, k is a channel index, $d_i$=bitrate for an $i^{th}$ modulation, and a selection of a combination of the n channels offering a maximum total bitrate $D_{totmax}$ while complying with a total power constraint.

* * * * *